Oct. 27, 1931.  C. R. BOGGS  1,829,209
INSULATION
Filed Nov. 7, 1928
Inventor
Charles R. Boggs
By Pennie, Davis, Marvin & Edmonds
Attorneys Patented Oct. 27, 1931

1,829,209

UNITED STATES PATENT OFFICE

CHARLES R. BOGGS, OF WABAN, MASSACHUSETTS, ASSIGNOR TO SIMPLEX WIRE & CABLE COMPANY, OF BOSTON, MASSACHUSETTS, A CORPORATION OF MASSACHUSETTS

INSULATION

Application filed November 7, 1928. Serial No. 317,883.

This invention relates to the manufacture of insulated wire and includes improvements in processes of manufacturing insulated wire and certain novel insulated wire products.

United States Letters Patent Nos. 1,443,149 and 1,682,857, issued January 23, 1923, and September 4, 1928, respectively, describe the production of aqueous dispersions including vulcanized but substantially uncoagulated rubber. I have discovered that such aqueous dispersions of vulcanized but substantially uncoagulated rubber, of which those described in these Letters Patent may be taken as examples, can be utilized in the manufacture of insulated wire to secure several special advantages with respect both to process and product.

The most general practice in the manufacture of rubber insulated wire involves the application of an unvulcanized rubber insulating compound to wire and subsequent vulcanization of the rubber insulating compound on the wire. It has been impossible, in the practical sense, to apply very thin continuous coatings of vulcanized rubber insulation to wire in this manner; continuous coatings less than 0.010 inches in thickness could be produced by this manufacturing method only at prohibitive cost and continuous coatings of less than 0.016 inches in thickness have very seldom been produced by this method.

Other methods of application of vulcanized rubber insulation to wire have been proposed and have been used, but none of such prior methods of manufacture have materially avoided this limitation as to thickness of the applied vulcanized rubber insulation.

This difficulty has prevented the use of rubber insulation on wire for many purposes where, if it could be applied in a sufficiently thin continuous coating, it would be of enormous practical advantage.

For example, vulcanized rubber insulation is superior to any substitute insulation on distributing-frame wire used in telephone switch-boards, particularly because of its resistance to humidity, yet the limitations of space with respect to large telephone switchboards have in many cases necessitated the use of other insulation for this purpose because, hitherto, a satisfactory continuous coating of vulcanized rubber insulation of sufficient thinness could not be produced at a reasonable cost. The thinnest coatings of vulcanized rubber insulation that could be produced hitherto, moreover, made the aggregate amount of rubber in an installation so large as materially to increase the difficulty of flame-proofing the installation.

By means of my invention, I can apply to wire a continuous coating of vulcanized rubber insulation of high quality in thicknesses as small as 0.001 inch or less. And my invention includes manufacturing methods which make possible the production of such insulated wire at a cost much less than that at which wire could be insulated with vulcanized rubber insulation of any comparable thickness by previously known methods. In this respect, my invention provides an insulated wire product never before available. Such an insulated wire is illustrated in the appended drawing in which a wire 1 is shown as having an insulating covering 2 thereon.

According to my invention, instead of applying an unvulcanized rubber insulating compound to wire and vulcanizing it on the wire, I apply the rubber insulating compound to the wire in the form of an aqueous dispersion including vulcanized but uncoagulated rubber, so that the only necessary operation subsequent to the application of the rubber insulating compound is drying instead of vulcanization. I thus secure a number of important advantages with respect both to process and product.

In one way of carrying out my invention, I coat the wire with an aqueous dispersion of a rubber insulating compound including vulcanized but substantially uncoagulated rubber by passing it through a bath of the aqueous dispersion, such as those described in the Letters Patent above mentioned, and then pass the coated wire through a drying operation. This operation is repeated as many times as may be required to build up a coating of the desired thickness.

In another way of carrying out my invention, I extrude a coating of an aqueous dispersion of a rubber insulating compound including vulcanized but substantially uncoagulated rubber upon the wire and immediately subject the extruded coating to the action of a coagulant, for example a bath of acetic acid or formic acid, and then pass the coated wire through a drying operation. A thicker coating can be produced in a single such operation than by a single operation of the method first described.

In another way of carrying out my invention, I coat the wire with an aqueous dispersion of a rubber insulating compound including vulcanized but substantially uncoagulated rubber by passing it through a bath of the aqueous dispersion, then subject the coated wire to the action of a coagulant, and then pass the coated wire through a drying operation.

I also may apply an aqueous dispersion of the rubber insulating compound including vulcanized but substantially uncoagulated rubber to the wire by electro-deposition or by spraying upon the wire from an annular nozzle.

In carrying out my invention, the applied coating of the dispersed rubber insulating compound may be dried in any convenient manner. For example, the water of the aqueous dispersion may be removed by evaporation, by the application of heat or vacuum, or preceding such drying part of the water may be squeezed out, for example by passing the coated wire between rollers. The drying operation may be carried out, for example, by passing the coated wire through a conventional drying tower, or, as another example, by passing it through a high frequency magnetic field generating sufficient heat in the metal of the conductor by induction to dry the applied rubber insulation from the inside out. If the applied rubber insulation is partially dried by passing the coated wire between squeezing rollers, for example, an electrical potential may be set up between the wire and the rollers to assist in the removal of water.

Various compounding materials commonly used in rubber insulating compounds may be incorporated in vulcanized rubber insulation applied according to my invention, for example, by dispersion in the aqueous dispersion of the vulcanized but uncoagulated rubber as described in the Letters Patent above mentioned. The rubber insulating compound may include, for example, compounding materials such as reclaimed rubber, zinc oxide, lithopone, whiting and mineral rubber.

Vulcanized rubber insulation can be applied to wire directly according to my invention, or to wire covered with fibrous materials such as silk or cotton windings or the like, or to composite cords or cables including two or more separate conductors, or as an outer covering to cords or cables, single conductor or multi-conductor, generally.

With respect to product, my invention makes possible a product more uniform, particularly with respect to degree of vulcanization, than hitherto possible, except by relatively expensive manufacturing methods involving the application of a metallic covering to the rubber insulation before vulcanization and the removal of such covering after vulcanization. The rubber insulating compound, in carrying out my invention, is vulcanized in bulk so that the vulcanization is under exact control and under control independent of any manipulation involving the handling of the wire.

Similarly, the practice of my invention makes possible exact control of the constitution of the rubber insulating compound, particularly with respect to free sulphur in the vulcanized insulation. This is particularly important where the rubber insulation contacts directly with a copper conductor since in such cases free sulphur tends to form copper sulphide which has a deleterious effect with respect both to the copper and to the rubber insulation.

As an outer covering for light flexible cords and cables, the vulcanized rubber compound of my invention is particularly advantageous. By means of my invention, such cords and cables can be given that resistance to humidity peculiar to vulcanized rubber compounds at a minimum expense. Likewise, such cords and cables can be given markedly improved resistance to wear through abrasion at a minimum expense in this manner.

My invention also affords important advantages in the manufacture of cords and cables where decorative value is important. Such cords and cables, for example, can be finished with a thin coating by a vulcanized rubber insulating compound including a dye or pigment by means of my invention. Also, a decorative fabric finish, a braided jacket or the like, having a decorative value because of color scheme or pattern, can be covered with a thin transparent coating of vulcanized rubber insulation by means of my invention, leaving the decorative value of the cord or cable unimpaired yet giving it in addition all of the advantages of this jacket of vulcanized rubber insulation.

With respect to process, my invention is particularly advantageous in reducing manufacturing cost; the practice of my invention makes possible important economy with respect to power and labor and frequently with respect to plant required for any given capacity.

I claim:

An improved insulated wire product which comprises a conductor insulated with a continuous coating less than 0.016 inches in thickness of a rubber insulating compound, said compound being the coagulated deposition product of an aqueous dispersion including substantially uncoagulated vulcanized rubber.

In testimony whereof I affix my signature.

CHARLES R. BOGGS.